(12) United States Patent
Jain et al.

(10) Patent No.: US 10,387,401 B2
(45) Date of Patent: Aug. 20, 2019

(54) VERSION CONTROL OF RECORDS IN AN ELECTRONIC DATABASE

(71) Applicant: ORACLE INTERNATIONAL CORPORATION, Redwood Shores, CA (US)

(72) Inventors: Lalit K. Jain, Hyderabad (IN); Ganesh H. Shivaprakash, Bangalore (IN); Vinay P. Kompella, Hyderabad (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 259 days.

(21) Appl. No.: 15/268,809

(22) Filed: Sep. 19, 2016

(65) Prior Publication Data

US 2017/0277743 A1 Sep. 28, 2017

(30) Foreign Application Priority Data

Mar. 28, 2016 (IN) .............................. 201641010512

(51) Int. Cl.
*G06F 17/30* (2006.01)
*G06F 16/23* (2019.01)
*G06F 16/22* (2019.01)
*G06F 16/18* (2019.01)

(52) U.S. Cl.
CPC ...... *G06F 16/2336* (2019.01); *G06F 16/1873* (2019.01); *G06F 16/22* (2019.01); *G06F 16/221* (2019.01); *G06F 16/2358* (2019.01); *G06F 16/2365* (2019.01)

(58) Field of Classification Search
CPC ........... G06F 17/30359; G06F 17/3023; G06F 17/30315; G06F 17/30309; G06F 17/30356; G06F 16/2336; G06F 16/22; G06F 16/221; G06F 16/1873; G06F 16/2358; G06F 16/2365
USPC ......................................... 707/638, 695, 806
See application file for complete search history.

(56) References Cited

U.S. PATENT DOCUMENTS

| | | | |
|---|---|---|---|
| 6,460,052 B1 | 10/2002 | Thomas et al. | |
| 6,868,425 B1* | 3/2005 | Bergstraesser | .... G06F 17/30607 |
| 2012/0084257 A1 | 4/2012 | Bansode et al. | |
| 2012/0117462 A1* | 5/2012 | Jacobson | .......... G06F 17/30292 |
| | | | 715/249 |

(Continued)

*Primary Examiner* — Hares Jami
(74) *Attorney, Agent, or Firm* — Kraguljac Law Group, LLC

(57) ABSTRACT

Systems, methods, and other embodiments associated with concurrently maintaining separate versions of records in an electronic database are described. In one embodiment, a method includes enabling the electronic database to concurrently store separate versions of a record by using a set of system columns to maintain the separate versions together in the electronic database and provide access to each of the separate versions in isolation from one another. The example method may also include, in response to identifying a change request to modify the record, generating an additional version of the record in the electronic database by adding the additional version into the electronic database with a new row identifier in a row identifier column and a row identifier from the record stored in the source column to uniquely identify the additional version as a version of the record and avoid conflicts between multiple versions of the record.

14 Claims, 11 Drawing Sheets

(56) References Cited

U.S. PATENT DOCUMENTS

2015/0261805 A1\* 9/2015 Lee .................. G06F 17/30353
707/703

\* cited by examiner

305 — BUSCOMP Table (Primary Key: ROW_ID)

| ROW_ID | NAME | TABLE_NAME | CLASS_NAME | BRANCH | VERSION | SRC_ID |
|---|---|---|---|---|---|---|
| 1-1 | Account | S_PARTY | CSSBCAccountSIS | MAIN | 1 | 1-1 |

310 — FIELD Table (One-to-many child of BUSCOMP Table, Primary Key: ROW_ID, Foreign Key: BUSCOMP_ID)

| ROW_ID | NAME | FORCEACTIVE | CALCULATED | BUSCOMP_ID | COL_NAME | BRANCH | VERSION | SRC_ID |
|---|---|---|---|---|---|---|---|---|
| 2-1 | Account Status | N | N | 1-1 | STATUS | MAIN | 1 | 2-1 |
| 2-2 | Account Name | N | N | 1-1 | NAME | MAIN | 1 | 2-2 |
| 2-3 | Account Site | N | N | 1-1 | LOC | MAIN | 1 | 2-3 |

315 — FIELD_USER_PROPS Table (One-to-many child of FIELD Table, Primary Key: ROW_ID, Foreign Key: FIELD_ID)

| ROW_ID | FIELD_ID | NAME | VALUE | BRANCH | VERSION | SRC_ID |
|---|---|---|---|---|---|---|
| 3-1 | 2-1 | DisableSort | FALSE | MAIN | 1 | 3-1 |
| 3-2 | 2-1 | ReadOnly | TRUE | MAIN | 1 | 3-2 |
| 3-3 | 2-3 | DisableSort | TRUE | MAIN | 1 | 3-3 |
| 3-4 | 2-3 | ReadOnly | FALSE | MAIN | 1 | 3-4 |

| ROW_ID | NAME | TABLE_NAME | CLASS_NAME | BRANCH | VERSION | SRC_ID |
|---|---|---|---|---|---|---|
| 1-1 | Account | S_PARTY | CSSBCAccountSIS | MAIN | 1 | 1-1 |

510

| ROW_ID | NAME | FORCE ACTIVE | CALCULATED | BUSCOMP_ID | COL_NAME | BRANCH | VERSION | SRC_ID |
|---|---|---|---|---|---|---|---|---|
| 2-1 | Account Status | N | N | 1-1 | STATUS | MAIN | 1 | 2-1 |
| 2-2 | Account Name | N | N | 1-1 | NAME | MAIN | 1 | 2-2 |
| 2-3 | Account Site | N | N | 1-1 | LOC | MAIN | 1 | 2-3 |
| 2-4 | Account Status | Y | N | 1-1 | STATUS | DEV2 | 1 | 2-1 |
| 2-5 | Account Site | N | Y | 1-1 | LOC | DEV1 | 2 | 2-3 |

515

| ROW_ID | FIELD_ID | NAME | VALUE | BRANCH | VERSION | SRC_ID |
|---|---|---|---|---|---|---|
| 3-1 | 2-1 | DisableSort | FALSE | MAIN | 1 | 3-1 |
| 3-2 | 2-1 | ReadOnly | TRUE | MAIN | 1 | 3-2 |
| 3-3 | 2-3 | DisableSort | TRUE | MAIN | 1 | 3-3 |
| 3-4 | 2-3 | ReadOnly | FALSE | MAIN | 1 | 3-4 |
| 3-5 | 2-3 | ReadOnly | TRUE | DEV1 | 1 | 3-4 |
| 3-6 | 2-3 | ReadOnly | FALSE | DEV1 | 2 | 3-4 |

| ROW_ID | NAME | TABLE_NAME | CLASS_NAME | BRANCH | VERSION | SRC_ID |
|---|---|---|---|---|---|---|
| 1-1 | Account | S_PARTY | CSSBCAccountSIS | MAIN | 1 | 1-1 |

810

| ROW_ID | NAME | FORCEACTIVE | CALCULATED | BUSCOMP_ID | COL_NAME | BRANCH | VERSION | SRC_ID |
|---|---|---|---|---|---|---|---|---|
| 2-1 | Account Status | N | N | 1-1 | STATUS | MAIN | 1 | 2-1 |
| 2-2 | Account Name | N | N | 1-1 | NAME | MAIN | 1 | 2-2 |
| 2-3 | Account Site | N | N | 1-1 | LOC | MAIN | 1 | 2-3 |
| 2-5 | Account Site | N | Y | 1-1 | LOC | MAIN | 2 | 2-3 |

540, 545, 525

815

| ROW_ID | FIELD_ID | NAME | VALUE | BRANCH | VERSION | SRC_ID |
|---|---|---|---|---|---|---|
| 3-1 | 2-1 | DisableSort | FALSE | MAIN | 1 | 3-1 |
| 3-2 | 2-1 | ReadOnly | TRUE | MAIN | 1 | 3-2 |
| 3-3 | 2-3 | DisableSort | TRUE | MAIN | 1 | 3-3 |
| 3-4 | 2-3 | ReadOnly | FALSE | MAIN | 1 | 3-4 |
| 3-6 | 2-3 | ReadOnly | FALSE | MAIN | 2 | 3-4 |

| ROW_ID | NAME | TABLE_NAME | CLASS_NAME | BRANCH | VERSION | SRC_ID |
|---|---|---|---|---|---|---|
| 1-1 | Account | S_PARTY | CSSBCAccountSIS | MAIN | 1 | 1-1 |

1010

| ROW_ID | NAME | FORCEACTIVE | CALCULATED | BUSCOMP_ID | COL_NAME | BRANCH | VERSION | SRC_ID |
|---|---|---|---|---|---|---|---|---|
| 2-1 | Account Status | N | N | 1-1 | STATUS | MAIN | 1 | 2-1 |
| 2-2 | Account Name | N | N | 1-1 | NAME | MAIN | 1 | 2-2 |
| 2-5 | Account Site | N | Y | 1-1 | LOC | DEV1 | 2 | 2-3 |

525

1015

| ROW_ID | FIELD_ID | NAME | VALUE | BRANCH | VERSION | SRC_ID |
|---|---|---|---|---|---|---|
| 3-1 | 2-1 | DisableSort | FALSE | MAIN | 1 | 3-1 |
| 3-2 | 2-1 | ReadOnly | TRUE | MAIN | 1 | 3-2 |
| 3-3 | 2-3 | DisableSort | TRUE | MAIN | 1 | 3-3 |
| 3-6 | 2-3 | ReadOnly | FALSE | DEV1 | 2 | 3-4 |

VERSION CONTROL OF RECORDS IN AN ELECTRONIC DATABASE

CROSS REFERENCE TO RELATED APPLICATIONS

This disclosure claims the benefit of India Provisional Patent Application serial number 201641010512 filed Mar. 28, 2016, titled "Workspace Management For Relational Metadata" inventors: Jain et al., and assigned to the present assignee.

BACKGROUND

A database stores data and permits access to the data using, for example, queries to the database. In general, the database includes tables formed from columns and rows. The columns define a structure of each table by specifying which data elements are included within each row of the tables. The rows define individual data records within each table that are comprised of data elements defined by the columns. Thus, a table has a set of defined columns and a variable number of rows depending on how many records are in a given table. Because data may be added and deleted from tables, the number of records/rows may fluctuate. Moreover, the records themselves may be modified during operation. Consequently, the data of the database is in flux and may change over time.

Furthermore, a database may electronically store records that include general textual information (e.g., medical records), map data (e.g., satellite images) or application metadata (e.g., configuration metadata) that defines various aspects of how an application executes. The application metadata may not be modified as frequently as other types of data (e.g., medical records); however, over the lifecycle of the application, developers may wish to iteratively update the application metadata to improve functionality and add new features to the application. Because the application actively uses the application metadata from the database while executing, a whole separate copy of the database may be implemented for development purposes to avoid interfering with operation of the application. In other words, the database may be copied so that the developers can iterate changes without impacting how the application is presently executing in a production environment for end users.

However, maintaining an additional development database is cumbersome and costly. Additionally, other difficulties still persists such as each developer editing the database independently causing conflicts between separate developers. Thus, even though a separate development database may be implemented, this does not solve all of the difficulties but instead shifts the difficulties to a separate space. Consequently, separate workspaces may be used to provide for independent development of separate portions of the development database without interference. However, present workspace solutions are database system dependent. That is, each separate database system is produced by a different vendor and includes separate idiosyncrasies. Thus, the workspace solutions are also specific to the particular database system and do not function when applied to different database systems since they are developed specifically for a certain vendor. This lack of cross-platform compatibility severely complicates implementing solutions for development by multiple individuals within a single database.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates one example of database tables configured to track multiple versions of records.

FIG. 5 illustrates another example of database tables that include separate versions of records.

FIG. 8 illustrates one example of database tables that include records that have been merged together from separate workspaces.

FIG. 10 illustrates one example of a selected version of an electronic database displayed for a workspace.

DETAILED DESCRIPTION

Figure 1:
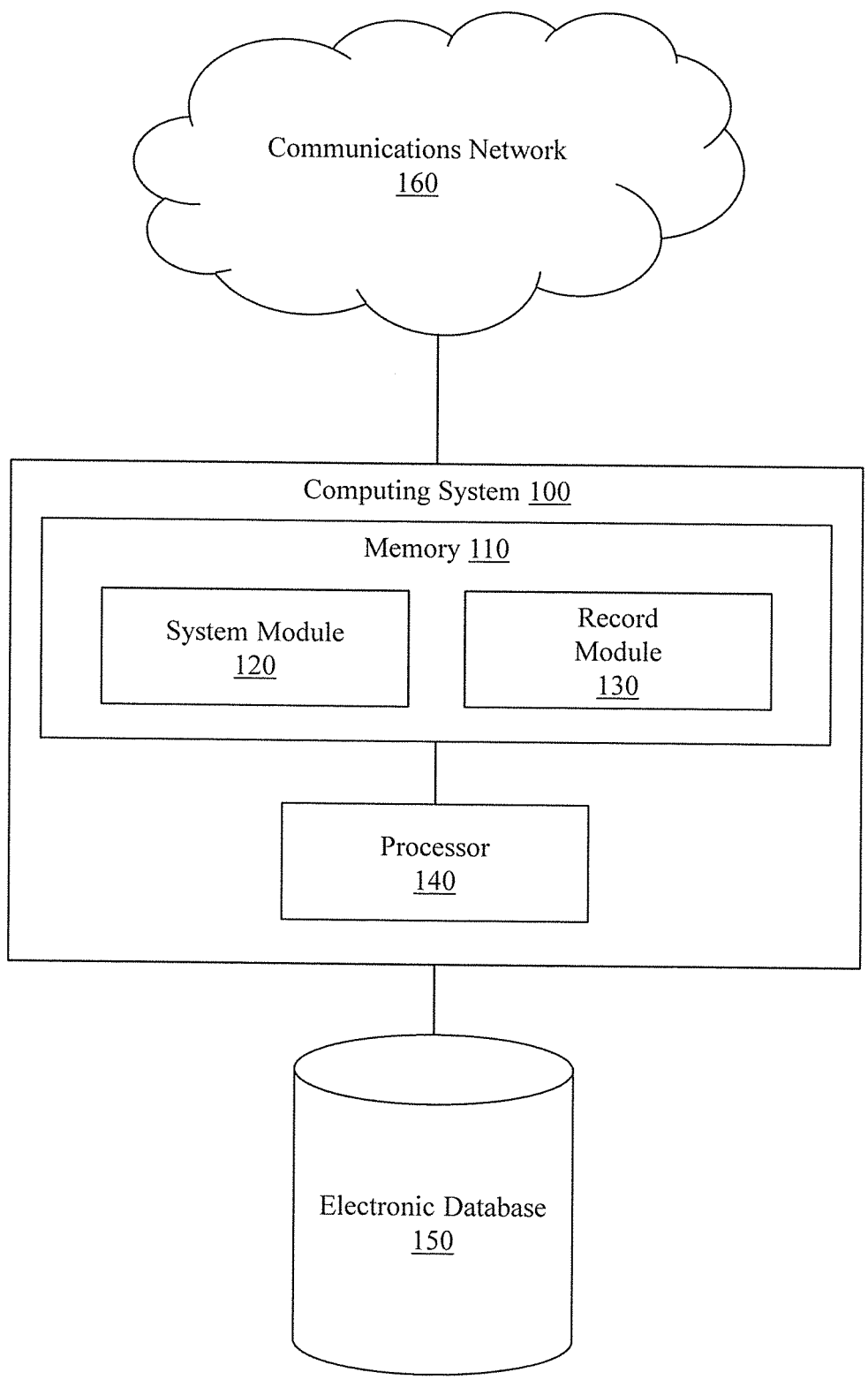
FIG. 1 illustrates one embodiment of a system associated with maintaining separate versions of database records together in a single instance of an electronic database.

Systems and methods are described herein that implement version control of data records in an electronic database and provide for concurrently maintaining separate versions of records in the electronic database. As described in the background, multiple developers may wish to separately modify application metadata that is stored in an electronic database or, more broadly, . simply modify database records while not losing previous versions and while maintaining each version separately so that conflicts between developer versions and/or a production version do not occur. Accordingly, in one embodiment, a computing system enables a database to accept changes and maintain the changes as different versions of records concurrently to avoid conflicts between separate versions. By enabling the computing system to maintain separate versions of records, separate versions of the electronic database itself can be derived and exposed to various entities (e.g., the application, different developers, and so on) so that the entities can concurrently operate on and modify the electronic database without interfering with each other.

Furthermore, the computing system implements the present system and methods using database functionality that is available across separate database system platforms. Thus, the computing system implements the disclosed system and methods independently of a particular vendor platform associated with an electronic database system. To accomplish implementing the system and methods to be platform independent, several considerations are undertaken.

First, the computing system alters a schema of the database to include additional system columns in tables that are to support the added versions. The added columns permit adding additional records as the additional versions so that the additional records can be tracked as separate versions of a record instead of overwriting an original version of the record. Thus, the computing system alters the general structure of the database in such a way that the system can maintain many versions of records that correlate with different versions of the electronic database concurrently and also provide independent access to the separate versions.

Second, the computing system acts as an intermediary between the accessing entities (e.g., application, developers, and so on) and the electronic database. Because the database will include multiple versions of a single record in a table, a plain access/query to the database could potentially return multiple versions of the same record, which is not desirable when attempting to present an entity with consistent access to a single version. Therefore, the computing system generates queries to the electronic database on behalf of the entities to derive a display of a selected version using results of the query. In other words, when an entity (e.g., a developer) wishes to access a particular version, the computing system generates a query on the behalf of the entity that produces results from the electronic database including versions of records consistent with a single version of the electronic database that is relevant to the entity. In this way, the computing system mediates access to the electronic database to ensure that a relevant version of the overall database is presented.

In a similar manner, the computing system also directs changes to versions of records that are specific to the particular entity by specifically generating database controls that are directed to the indicated versions using the previously noted added system columns as identifiers. Accordingly, the added system columns and supporting logic of the computing system permit multiple versions of the electronic database to co-exist while, for example, an application uses a live production version and developers use additional developer versions simultaneously from a single instance of the electronic database. In this way, the computing system maintains multiple versions within the electronic database without causing downtime or conflicts between the separate versions.

As a preliminary matter and as may be apparent from the discussion so far, the term "versions" is used in relation to both records and the overall database within this disclosure. As a clarification of this use, it should be appreciated that in general each separate version of an individual record along with other unchanged records of the electronic database logically form a separate version of the electronic database. However, within this disclosure, a particular version of the electronic database is generally understood to be a collection of records that are particular to each entity (e.g., application, developer, and so on) that accesses the electronic database.

For example, a version of the electronic database that relates to the application is generally a baseline version of the application that includes original unmodified records of the electronic database. By contrast, a branch of the electronic database that is a version of the electronic database specific to a developer or other entity includes a portion of the original unmodified records of the electronic database while also including records that have been modified from the original version that are specific to the particular version. Accordingly, selected versions of the electronic database associated with developers or other accessing entities generally relate to isolated workspaces that are branches of the electronic database including a mix of modified records (also referred to as separate versions of records) and original unmodified records. In either case, both the modified and unmodified records are stored together within the electronic database and are differentiated using the noted system columns, generated queries and other mechanisms discussed herein.

With reference to FIG. 1, one embodiment of a system 100 associated with enabling separate versions of an electronic database to co-exist while providing independent access to the separate versions is illustrated. In one embodiment, the computing system 100 is a computing/data processing system including an application or collection of distributed applications for enterprise organizations. The applications and the computing system 100 may be configured to operate with or be implemented as a cloud-based networking system, a software as a service (SaaS) architecture, or other type of networked computing solution. In one embodiment, the computing system 100 is a centralized server-side application that provides at least the functions disclosed herein and that is accessed by many users/developers and/or other applications via computing devices/terminals communicating with the computing system 100 (functioning as the server) over a communications network 160 (e.g., the Internet, Local Area Network (LAN), etc.).

In one embodiment, one or more of the components described herein are configured as program modules stored in a non-transitory computer readable medium. The program modules are configured with stored instructions that when executed by at least a processor cause the computing system 100 to perform the corresponding function(s) as described herein. For example, the computing system 100 includes a memory 110 that stores a system module 120 and a record module 130. A processor 140 is connected to the memory 110 and executes the instructions of the modules 110 and 120 to cause the computing system 100 to perform various actions as discussed herein.

Additionally, the computing system 100 is in communication with an electronic database 150. In one embodiment, the computing system 100 controls the electronic database 150 to enable storage of multiple versions of a single record to support concurrent versions of the electronic database 150 to co-exist. In one embodiment, the electronic database 150 is a relational database system that stores metadata relating to an application. The application may be an enterprise application executing on one or more servers that accesses the electronic database 150 via the communications network 160 and the computing system 100.

For example, the metadata of the application includes various settings for how the application displays information, configuration parameters for how the application processes data, and, more generally, variables/functional information that relate to functioning of the application and how the application operates. Of course, while the electronic database 150 is discussed in relation to application metadata, the presently disclosed systems and methods may also be implemented with respect to databases that store textual content, geographic information, image content, and so on. Additionally, the electronic database 150 while illustrated as being directly connected with the computing system 10 may be connected with the computing system 100 via the communications network 160 and may be distributed across multiple devices as a cloud service. In either case, the computing system 100 generally controls access to the electronic database 150 to enable the separate versions to co-exist within a single instance of the electronic database 150 and to ensure that respective entities access a correct version.

Figure 2:
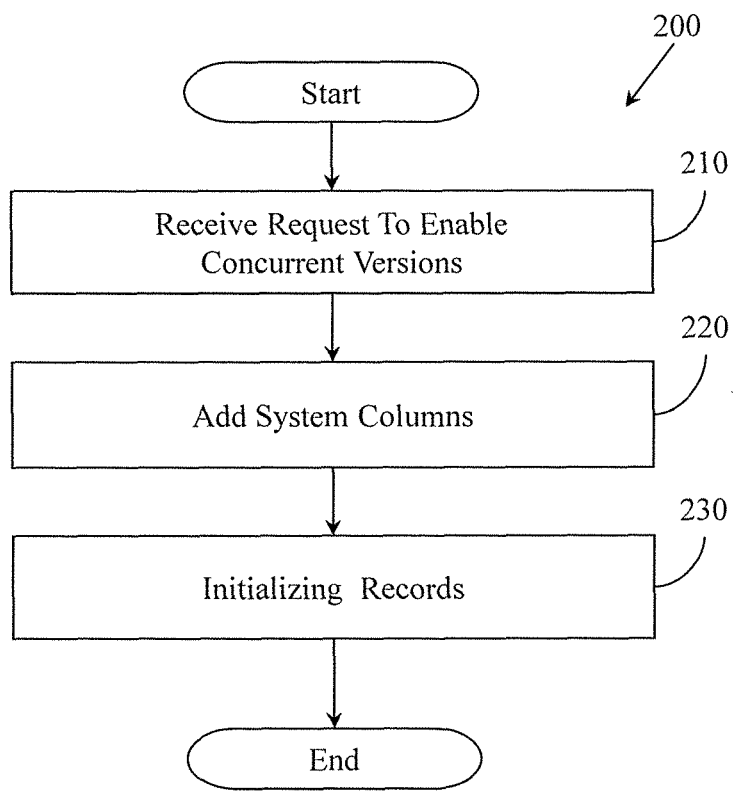
FIG. 2 illustrates another embodiment of a method associated with configuring a database to store separate versions of records together so that multiple versions of records can co-exist in the electronic database.

Further aspects of enabling the separate versions within the electronic database 150 will be discussed in relation method 200 of FIG. 2. For purposes of explanation, method 200 will be discussed from the perspective of the computing system 100. It should be appreciated that while discussed from the perspective of the computing system 100 for purposes of brevity, the method 200 may be implemented on other systems with differing configurations.

Method 200 generally describes an algorithm for enabling the electronic database 150 to concurrently store separate versions of records that form separate versions of the electronic database 150. Additional aspects of the separate versions of the electronic database 150 will be explained subsequently; however, as noted previously, while separate versions of records are discussed along with separate versions of the electronic database 150 itself, each separate version of a record either individually or in combination with other linked versions of records logically correlate with a separate version of the electronic database 150. As such, before the electronic database 150 can concurrently support separate versions of records as envisioned within this disclosure, the computing system 100, in one embodiment, executes instructions of the system module 120 that cause the computing system 100 to perform method 200 as an initial process to configure the electronic database 150 to control versions of data records in the electronic database to support multiple versions of the records.

At 210, the system module 120 receives a request to enable concurrent versions of records in the electronic database 150. In one embodiment, the system module 120 receives the request by decoding an electronic communication, buffering the electronic communication, and storing the electronic communication. Furthermore, the system module 120 may also identify relevant aspects of the request (i.e., security credentials) to ensure the modifications are authorized.

At 220, in response to the request, the system module 120 adds system columns to the electronic database 150 to support concurrent versions of the records. In one embodiment, the system module 120 adds three system columns that each separately store information for tracking versions of records. In general, the system module 120 adds, for example, the three system columns to tables in the electronic database 150 that are to support multiple versions of records co-existing. In other words, a table that supports multiple versions is modified by the system module 120 to include the extra columns while a table that does not support the multiple versions is not modified. This manner of modifying tables avoids adding columns to extra tables that, for example, do not store application metadata. Consequently, the system module 120 adds the three columns by modifying a schema of the electronic database 150 for metadata tables while not modifying the schema for other tables that are related to other aspects of how the electronic database 150 operates (e.g., database user access tables).

Furthermore, in one embodiment, the three columns include a branch column, a version column, and a source identifier column. The branch column identifies whether a particular record belongs to a main branch that is a live version of the electronic database 150 used by the application or whether the particular record is a version associated with a workspace. Thus, the branch column stores a branch identifier that indicates an identity of an originator for the particular record (e.g., main or DEV1 ). The originator is generally a workspace. A workspace is an environment within which a display of the electronic database is provided to an end user (e.g., developer). In general, a workspace corresponds to a specific branch identifier that is used to track a branch of the electronic database 150 that is modified through the workspace. In other words, the workspace corresponds to a particular set of changes to the electronic database 150 that originate from the workspace and are tracked in the electronic database 150 using a unique branch identifier. Accordingly, for purposes of this discussion, a workspace and a branch are generally equivalent concepts in that the two generally correspond and a particular version of the electronic database 150 that is relevant to the workspace is tracked using a unique branch identifier of the workspace.

Additionally, workspaces are hierarchical in nature. A user can create a workspace branching off of any other existing workspace, thereby creating a hierarchy. As an example, if 2 workspaces MAIN and Dev1 already exist and Dev1 branches off of a 2nd version of MAIN (i.e MAIN/2), then a workspace Dev2 can be created branching off of a 4th version of Dev1 (i.e Dev1/4). Consequently, a hierarchy of workspaces Dev2→Dev1→MAIN is created. Furthermore, all the modifications to data in this workspace are stamped with the appropriate branch and version identifiers. An overlay will consider the hierarchy of workspaces (as derived during creation of the workspace) in order to produce the correct version of data for display.

The version column stores a version identifier that is used to either specify a particular version of the application to which the corresponding record belongs or, within a particular branch, is used to specify a separate version of records being altered through a single workspace. In this way, the version column supports multiple versions of the application that can be developed using the same electronic database 150 in parallel while also permitting multiple versions of records within a single workspace.

The source identifier column stores a source identifier for each row that indicates whether the present row is a version of another row. The source identifier column is responsible for tracking separate versions of a record. For example, for a newly added version of a record, the source identifier column stores a source identifier that matches a row identifier of a version of the record that the newly added version modifies.

Conversely, for an original version of a record, the source identifier column specifies a row identifier of the same original version of the record. In other words, for an original version of a record a row identifier and a source identifier match, whereas with a separate version of a record a row identifier and a source identifier do not match. Accordingly, for a new version of a record, the source identifier stores the row identifier of a previous version of the record which the new version modifies.

To better explain the three system columns, consider FIG. 3. FIG. 3 illustrates tables 305, 310, and 315 of the electronic database 150. The system module 120 has modified the tables 305, 310, and 315 to include the columns labeled "BRANCH," "VERSION," and "SRC_ID." More precisely, the system module 120 modifies a schema of the electronic database 150 to include the additional system columns. The schema is a portion of the electronic database 150 that defines a structure and organization of the various columns and tables that comprise the electronic database 150. Consequently, the system module 120 modifies a structure of the electronic database 150 itself to include the additional system columns when modifying the schema. Thus, each of the three illustrated tables have been modified to support multiple versions of the listed records by including the three system columns.

Continuing with method 200, at 230, the system module 120 initializes records of the electronic database 150 in tables where the three system columns have been added. In one embodiment, the system module 120 initializes the records by populating each of the three system columns with values that indicate the records are original records. Accordingly, the system module 120 stores values in each of the rows for the added system columns that identify the rows as original records. Because the rows/records exist when the three system columns are added to the electronic database 150, it is assumed that the records are original records at least for purposes of initializing the electronic database 150. Thus, the values for the columns are to identify the branch as a main or live production branch, the version is a present version of the application, and the source identifier matches the row identifier for each record. By matching the source identifier with the row identifier, the record reciprocally identifies itself as its own version and thus as an original record.

With brief reference again to FIG. 3, the three system columns for each of the tables 305, 310, and 315 are shown with initialized values for the three system columns of the existing rows/records. In FIG. 3, the SRC_ID (i.e., source identifier) for each of the records is initialized to equal the row identifier. The system module 120 initializes the source identifier to the row identifier to indicate the records are original records of the electronic database 150 at a point when the system module 120 enables concurrent versions. Furthermore, the branch identifier is initialized to a value of "MAIN" to indicate that the records are part of a main/live production version of the electronic database 150 that is actively in use by the application.

As will be discussed in greater detail subsequently, the branch identifier indicates a separate identifier that is, for example, a name of a workspace from which a separate version of a record is modified. Additionally, the version identifier column is set to "1" for all of the records since there is a single active version of the application that uses the electronic database 150 and no secondary versions for specific workspaces. As will be discussed further subsequently, a developer may select to which version of the application a particular version of a record belongs in order to, for example, better identify different changes to the records of the electronic database 150.

Figure 4:
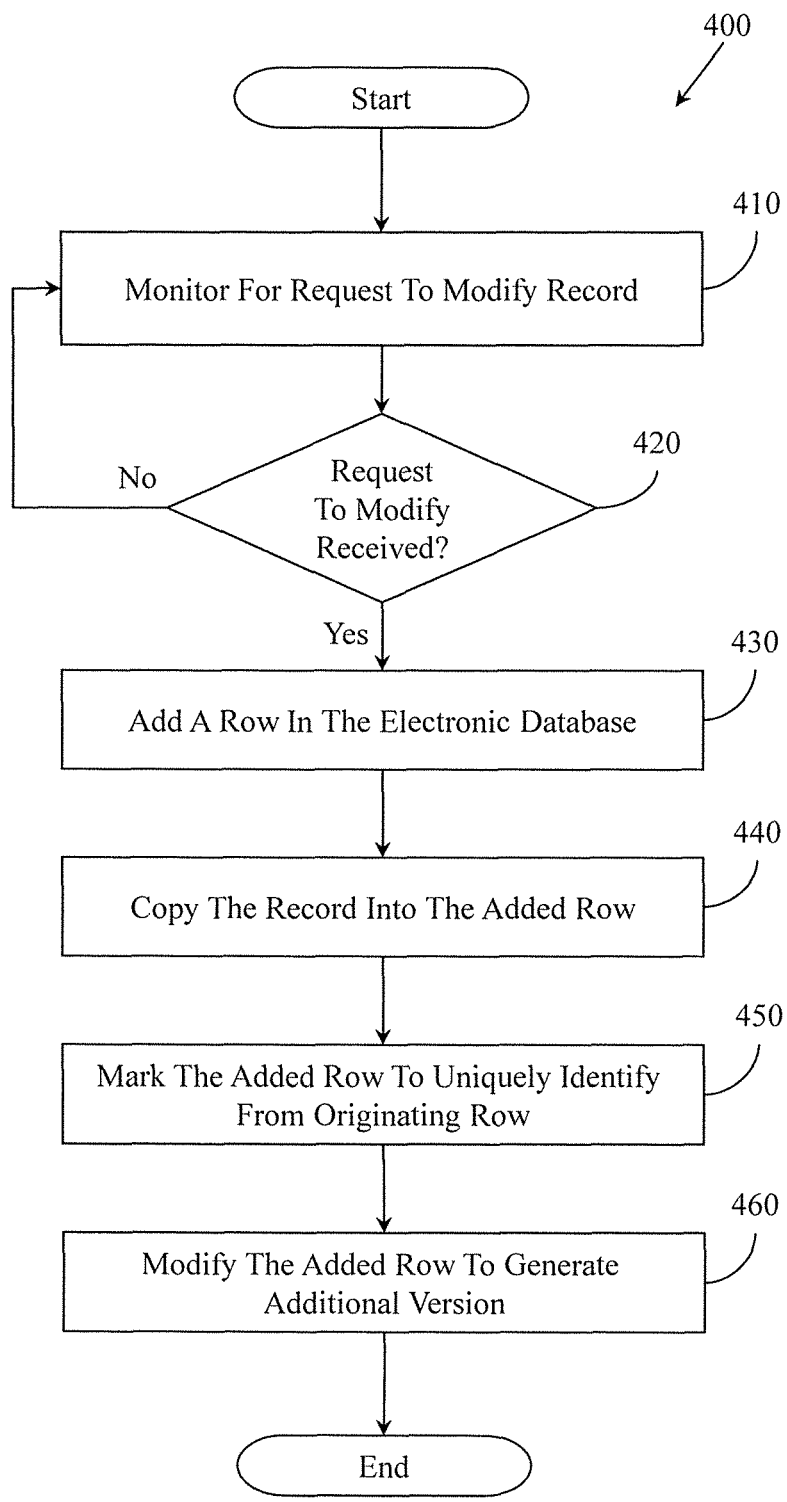
FIG. 4 illustrates one embodiment of a method associated with generating separate versions of records in an electronic database.

With reference to FIG. 4, one embodiment of method 400 that is associated with adding separate versions of records to the electronic database 150 is illustrated. At 410 of method 400, the record module 130 monitors for a modification request to the electronic database 150 to modify an existing record. While the example illustrated in FIG. 3 shows pre-existing records, the modification request to modify an existing record need not be to just original records. Once additional versions of records have been generated, the requests received at 410 may be to original records or to separate versions of the records.

In either case, the record module 130 monitors for modification requests to the electronic database 150. In one embodiment, the record module 130 acts as an intermediate service between the application database 150 and a requesting entity (e.g., the application, a workspace, etc.). In this way, the record module 130 intervenes within interactions between the requesting entities and the electronic database 150 to generate specific queries and other requests to the electronic database 150 that support the separate versions of records co-existing. By intervening between the requesting entities and the electronic database 150, the record module 130 can ensure cross-platform compatibility by not directly modifying how the electronic database 150 functions but instead by altering the interactions with the electronic database 150 as will be discussed in greater detail subsequently.

At 420, the record module 130 performs a check for a request to determine whether the request is a request to modify/change a record or not. In one embodiment, the record module 130 checks whether a request is a modification request by parsing the request, identifying a field in the request that stores an indicator of a type for the request, and decodes the type to identify whether the request is a modification request.

If the request is not a modification request then the record module 130 continues to monitor for modification requests at 410. However, when a modification request is identified, the record module 130 proceeds to 430 to handle adding a new version of a record to the electronic database 150.

At 430, the record module 130 adds a new row in the electronic database 150. Reference to a row and a record within this disclosure generally refers to the same element. Additionally, the columns define elements within a row, while each separate row stores data that comprises a record. Thus, a row in a table generally embodies a record. In one embodiment, the record module 130 adds the new row by inserting an additional row into a table of a record that is to be modified. In this way, the record module 130 generates an additional record that can be modified in place of modifying a record identified by the request. Thus, the record identified by the request is preserved for use by other entities while the added row embodies a specific version that corresponds to a branch of the requesting entity.

At 440, the record module 130 copies the record specified by the request into the added row. The record module 130 copies data from the specified record into the new row with the exception of the three system columns. Accordingly, the application metadata that is stored in the originating row is duplicated into the added row to provide a separate version of the originating row.

At 450, the record module 130 marks the added row to indicate that the added row is a separate version of the originating record in the electronic database 150. In one embodiment, the record module 130 marks the added row to indicate that the added row is a separate version of a specified record and to link the added row with the specified version and, for example, a workspace.

It should be appreciated that, in one embodiment, requests to modify records in the electronic database 150 are associated with separate workspaces as previously indicated. The separate workspaces originate the requests through developers interacting with a displayed version of the electronic database 150 and specifying changes to records. The changes are then received as the requests at 420 of method 400. Additional details of workspaces will be discussed subsequently in relation to FIG. 9. In either case, marking the row generally includes storing a row identifier of an originating record into the source identifier of the newly added row. This indicates that the newly added row is a separate version of the originating row.

Furthermore, a row identifier of the newly added row is generated according to a sequence of other rows within the table and to uniquely identify the newly added row. Additionally, the record module 130 further parses the modification request to identify a workspace/branch identifier and whether the change is to correspond with a particular version identifier. Thus, the record module 130 stores the branch identifier, version identifier and source identifier in the newly added row so that the newly added row is uniquely identified as a separate version of another record and is further associated with a particular workspace and version.

At 460, the record module 130 modifies the added row according to the modification request. In one embodiment, the record module 130 identifies changes indicated within the request and modifies the newly added row according to the specified changes. That is, the record module 130 stores the indicated values of the changes in the row in place of values copied over from the specified/originating record. The changes may be to the application metadata itself or to foreign keys that are included within a record to specify a relationship to another record. In either case, the record module 130 changes the record according to the request.

As a result of the changes, the record module 130 has generated a new version of the specified/originating record in the electronic database 150 as a separate row that includes values in the three system columns to differentiate the added row from the specified row. In this way, multiple versions of a single record simultaneously co-exist in the electronic database 150 and can be selectively displayed to materialize a particular version/branch of the electronic database 150.

As one example of how separate versions of records are added and stored in the electronic database 150, consider FIG. 5. FIG. 5 illustrates tables 505, 510, and 515 that correspond to tables 305, 310, and 315 from FIG. 3 except that the tables of FIG. 5 include added versions of records. For example, table 510 includes added versions 520 and 525 while table 515 includes added versions 530 and 535. Analyzing the record 520 reveals that record 520 is an added version of record 540. This is evident from the source identifier of record 520 with a value of "2-1" referencing a row identifier value of the record 540. It should be noted that while the source identifier of the record 520 references a row identifier of a specified record, the row identifier of the record 520 is unique. The row identifier for each separate record in each table is unique in order to uniquely identify each record and isolate each record from other records in the electronic database 150. Accordingly, while the record 520 includes a unique row identifier as do other records, the indication of a source identifier that points to a separate record is what ultimately identifies the record 520 as a separate version.

Additionally, the record 520 includes a different value in the "forceactive" column than the record 540. Thus, the record 520 represents a modified version of the record 540 as changed by the record module 130 in response to the modification request. In this way, the record 520 is a separate version of the record 540 that includes values that are different from the record 540 while maintaining both records in the electronic database 150.

Furthermore, the record 520 also includes a different branch identifier of "DEV2" to indicate that the record 520 belongs to a branch of the electronic database 150 associated with a particular workspace "DEV2." This is in contrast to the MAIN branch identified with respect to the record 540. Additionally, a version for the record 520 specifies version "2," which correlates with a version within the workspace DEV2. Thus, the record 520 represents an update/change to the application metadata that is not yet active but is instead part of the development branch identified as DEV2 for a version 2 of the application.

Further analysis of the tables 510 and 515 reveal additional aspects how the record module 130 adds additional versions of records to the electronic database 150. For example, the record 525 illustrates one example of a separate version of record 545 that is part of a branch "DEV1," and a version "2." Furthermore the records 530 and 535 illustrate two example records that are both separate versions of one other record, the record 550.

Figure 6:
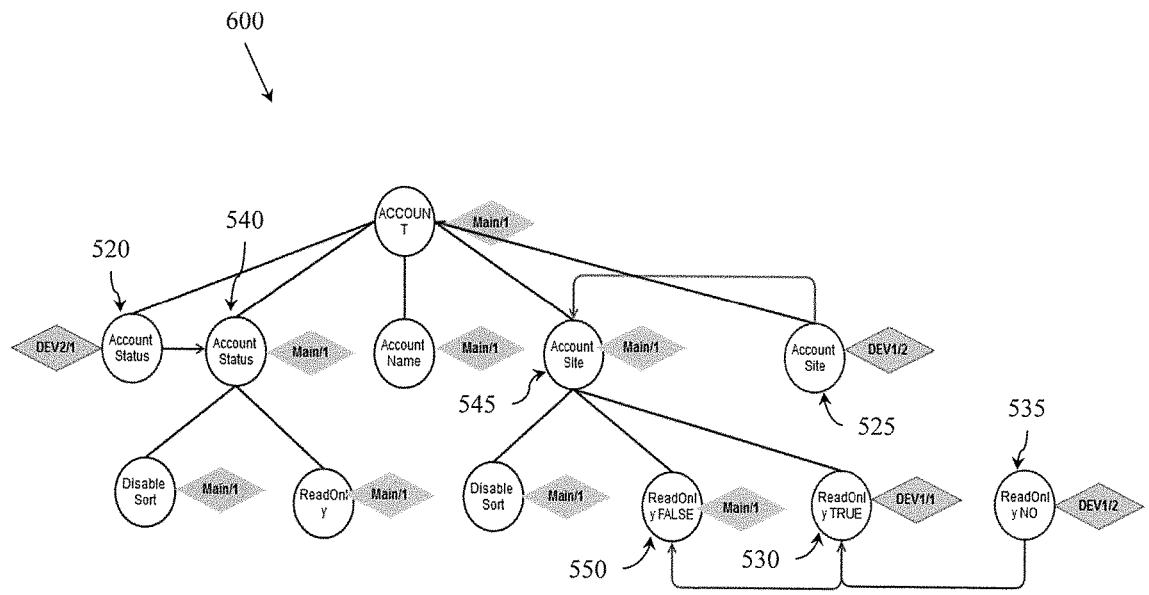
FIG. 6 illustrates an example tree representation of the records from FIG. 5.

Additional illustration of the separate versions of the records from FIG. 5 are represented in FIG. 6. FIG. 6 illustrates a tree data structure 600 that is a separate visual representation of the records from the tables 505, 510, and 515 of FIG. 5. The record numbering from FIG. 5 has been carried over to FIG. 6 to help illustrate the correlations between records and nodes. Each separate node in the tree 600 represents a different record from the tables 505, 510, and 515. Accordingly, another way to describe how the record module 130 adds a new version of a record is to characterize the process as copying a node in the tree 600 that is to be modified. This node-copy approach illustrates how additional versions of records are added to the electronic database 150 as separate records/nodes and how a single version of the electronic database 150 can be materialized by selecting particular branches of the tree 600 while isolating other separate versions of the tree 600 from view. Additional aspects of materializing the versions of the database will be discussed further with respect to FIG. 9.

Figure 7:
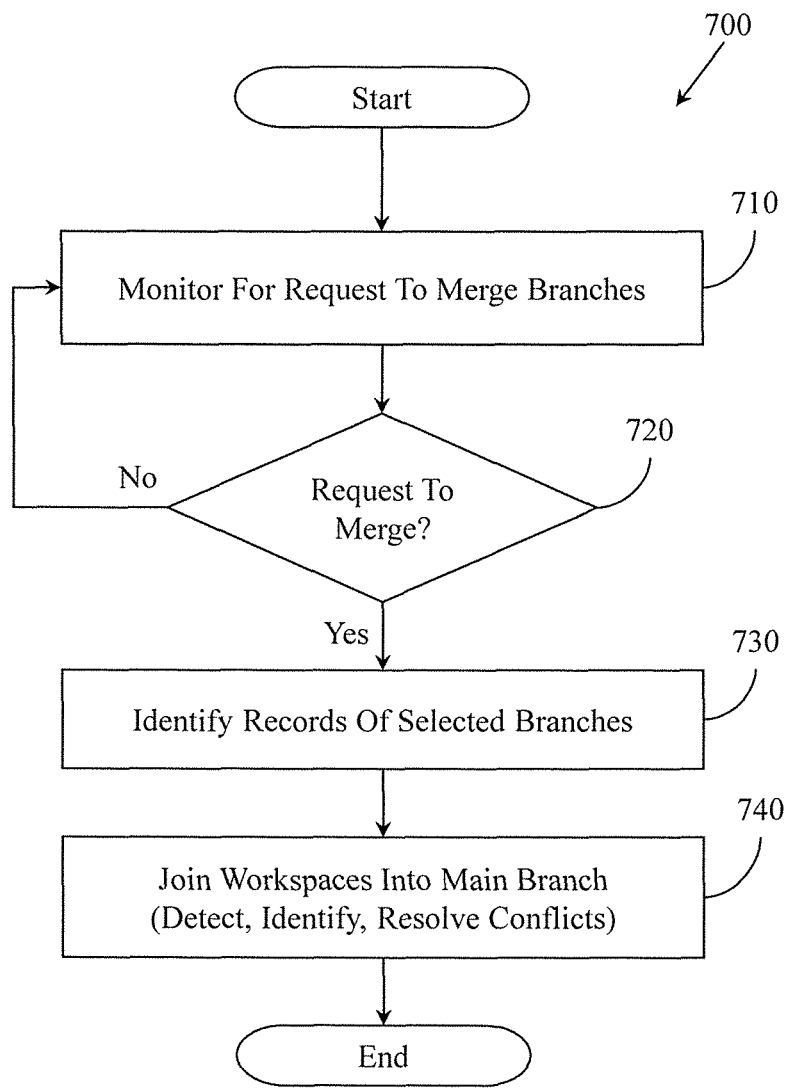
FIG. 7 illustrates one embodiment of a method associated with merging workspaces together in an electronic database.

With reference to FIG. 7, additional aspects of maintaining separate versions of records in the electronic database 150 are illustrated. For example, FIG. 7 illustrates method 700 that is associated with merging two or more branches of the electronic database 150 that correlate with separate workspaces. By logical extension the merging of two branches merges separate versions of the electronic database 150 since each branch represents changes of a version. In other words, merging provides for combining contents of two or more branches into a single branch. Thus, changes provided by multiple developers that worked on separate versions of the electronic database 150 concurrently can then integrated together into a single version.

It should be noted that the separate versions that are merged, refer to separate branches and not separate versions specific to the versions of the application or sub-versions within branches. The branches are separate versions of the electronic database 150 that are associated with separate workspaces.

At 710, the record module 130 monitors for a request to merge two or more branches of the electronic database 150 together. As mentioned previously, in one embodiment, the branches refer to separate versions of the electronic database 150 that are concurrently modified by separate requests from different workspaces via the record module 130. Each branch represents an accumulation of changes to the electronic database 150. Thus, after the modifications to the separate branches are, for example, ready to be integrated back into a main branch of the electronic database 150, a merge request is generated to cause the record module 130 to merge the branches. Accordingly, the record module 130 monitors for the merge requests at 710 by, for example, scanning requests received by the computing system 100.

At 720, the record module 130 performs a check on a received request to determine whether the request is a request to merge versions together. In one embodiment, the record module 130 checks whether a request is a merge request by parsing the request, identifying a field in the request that stores an indicator of a type of the request, and decoding the type to identify whether the request is a merge request.

If the request is not a merge request then the record module 130 continues to monitor for merge requests at 710.

However, when a merge request is identified, the record module 130 proceeds to 730 to handle merging workspaces together in the electronic database 150.

At 730, the record module 130 identifies records of the branches that have been selected to be merged. In one embodiment, the record module 130 parses the merge request to identify branch identifiers associated with the branches. The record module 130 may also identify version numbers to merge from the workspaces if the workspaces include multiple versions.

At 740, the record module 130 joins the workspaces into the main branch of the electronic database 150. In one embodiment, the record module 130 joins the workspaces into the main branch by, for example, requesting resolution of records from the main branch that conflict with the workspaces and modifying the branch identifiers of the workspace to be the same as the main branch. Thus, the modified versions of records from, for example, the developer branches that are being merged, replace existing versions in a new version of the main branch. In this way, the electronic database 150 is seamlessly updated with versions of records from the branches without, for example, causing downtime where the application cannot use the electronic database 150. In one embodiment, merging is performed by creating a new version on the target branch (e.g., MAIN is the target branch when developer branch is being merged into MAIN branch). The new version is generated by merging changes between the main branch and the developer branch. If there are conflicts between records, the system identifies the conflicts, then generates and displays prompts on a display to request electronic input from a user to resolve those conflicts as part of the merge process at 740.

Furthermore, when a separate version of a workspace (e.g., version 2) is merged into an existing version of the main branch (e.g., version 1), both versions may co-exist as separate main branches of the electronic database 150. In one embodiment, non-overlapping records, otherwise noted as records that do not have a corresponding version 2 may be represented by a materialized version of the electronic database 150 by using a version 1 to fill in gaps.

For example, FIG. 8 illustrates an example of a merge for branch DEV1 of version 2 into a MAIN branch of the electronic database 150. As illustrated in FIG. 8 the tables 805, 810, and 815 include records corresponding to merged workspaces as previously illustrated in tables 505, 510, and 515 of FIG. 5. For example, the record module 130 merges the DEV1 branch of version 2 into the MAIN branch by changing a value of the branch identifier column for the associated records to "MAIN." In the example illustrated in FIG. 8, the merged branch is associated with a version 2 of the application metadata. Thus, the record module 130 maintains the previous versions of the merged records since those records belong to version 1. However, if the merged records were part of version 1, then the record module 130 would have generated a new version.

Alternatively, the record module 130, in one embodiment, marks the records that would have been deleted as inactive so that the merged records are used for the present version of the electronic database 150 instead of the outdated records. To mark records as inactive, the system module 120 may add an additional column when enabling versioning at 220 of method 200 that stores an active/inactive flag for each record.

In either case, as illustrated in FIG. 8, tables 805, 810, and 815 represent a displayed view of the MAIN branch for both versions 1 and 2 of the electronic database 150 after being merged. It should be noted that the records 520 and 530 of branch DEV2/Version 1 and DEV1/version 1 illustrated in FIG. 5 remain as separate versions after the record module 130 merges branches DEV1/Version2 and MAIN. The records 520 and 530 remain separate because they are separate branches that are not being merged.

Figure 9:
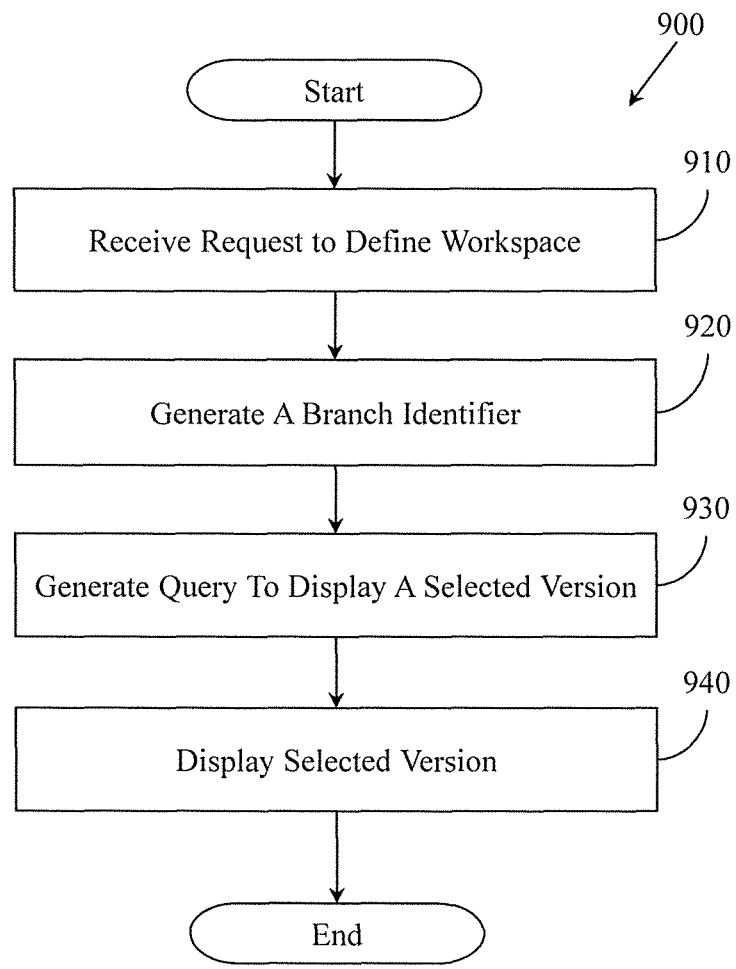
FIG. 9 illustrates an embodiment of a method associated with defining a workspace and displaying a selected version of the electronic database to the workspace.

To better explain the concept of branches and workspaces, further explanation is provided in relation to FIGS. 9 and 10. FIG. 9 illustrates one embodiment of method 900 that is associated with defining workspaces and displaying selected versions of the electronic database 150 for a workspace. For purposes of discussion, FIG. 9 will be discussed from the perspective of the computing system 100.

At 910, the system module 120 receives a workspace request to define a new workspace. The workspace request is from, for example, a remote device connected to the computing system 100 through the network 160, a process executing on the computing system 100, or another electronic source that desires to establish a branch within the electronic database 150. In one embodiment, the system module 120 monitors for the workspace request, and, upon receiving a request, identifies the request by parsing fields to determine whether a value of one or more fields specify that the request is a workspace request.

If the request is a workspace request, then, at 920, the system module 120 generates a branch identifier for the request. In one embodiment, the system module 120 generates the branch identifier by determining a unique sequence of characters to use as the branch identifier and assigning the branch identifier to the workspace. In this way, modifications to the electronic database 150 that originate from the workspace are tracked in the electronic database 150 using the unique branch identifier for the workspace.

More generally, the system module 120 defines separate workspaces so that separate branches, also referred to as separate versions of the electronic database 150, can be tracked and linked with a particular developer/user of the electronic database 150. Accordingly, the workspaces are, in essence, portals that permit a particular developer/user to edit the electronic database 150 while maintaining the edits separately from a live/main version of the electronic database 150 and from versions in use by other developers/applications.

Once a workspace/branch identifier has been established, then the record module can use the branch identifier to store changes separately for the workspace and to derive a version of the electronic database 150 that is specific to the workspace as will now be discussed. At 930, the record module 130 generates a query to the electronic database 150 to display a selected version of the electronic database 150.

The record module 130 uses a query to display the selected version because the electronic database 150 includes different versions of records that form different versions of the electronic database 150 itself. Thus, if a simple query is made to the electronic database 150 without formulating the query for a particular version, then the query would be against all versions of records present in the electronic database 150. Consequently, such a query would return results with duplicates for records that have differing values, which is not desirable since the focus is to present a single version.

This is because the different versions of records are stored together in tables as separate rows and, thus, access to a particular version occurs through the use of specially formulated queries that parse out or otherwise omit versions that are not relevant to a requesting workspace. Thus, the record module 130 uses the query to retrieve the selected version of the electronic database 150.

For example, the record module 130 identifies attributes of the workspace from a request received by the record module 130 to display the selected version. The attributes include, for example, a branch identifier of the workspace and may also include a version identifier within the workspace. That is because individual workspaces may define multiple versions within a branch, a version identifier may also be used to select an intended set of records from the electronic database 150.

In one embodiment, the record module 130 generates the query to initially group records with the same source identifier. The record module 130 gathers multiple versions of records together by grouping the records using the source identifier. Accordingly, the record module 130 produces the query to have multiple parts, the first part groups the records using the source identifier and also the branch identifier. A result of the first part includes groupings of, for example, MAIN branch versions of records along with versions of records for the entire hierarchy of branch identifiers from the leaf branch to a MAIN branch.

The record module 130 generates a second part of the query to rank the grouped records using a branch priority. That is, the selected version for the workspace correlates with a branch identifier of the workspace since the branch identifier tracks versions generated through the workspace. Accordingly, the record module 130 ranks records within the groups so that a selected version of a record is a record that belongs to the branch/workspace. If no records are specific to the branch, then a selected record is the MAIN line branch. In this way, the record module 130 produces a query that returns modified records over the main branch while returning main branch records when there is no correlating version for the workspace. In this way, the record module 130 overlays modified records of the selected version (i.e., workspace branch) over the MAIN branch to derive results from the electronic database 150 that represent the selected version that corresponds with the workspace.

In one embodiment, the record ranking takes the following form for each record:

$$\text{Record Rank} = \text{BRANCH Priority} \ast 100 + (\text{VERSION}) \quad \text{(Equation 1)}$$

In Equation 1, the branch priority is modified for each separate record by the record module 130 such that a branch identifier of a requesting workspace is provided with a numerical value that causes the record rank to have priority over records that are from the main branch by weighting the different branches accordingly. Examples of queries for displaying a selected version of the electronic database 150 are included in Appendix I.

In general, BRANCH Priority is a numeric value that the record module 130 calculates for a branch according to a requesting workspace. This is arrived at by the virtue of how the workspace was created. Each workspace in the hierarchy is assigned a numeric value starting from 0 for MAIN until a leaf workspace. For example, the branch priority of branch DEV1 is "1," whereas the MAIN branch would be "0." Subsequent DEV workspaces may continue in numbering with DEV2 being "2" and so on.

Thus, from a logical perspective, the query generated by the record module 130, overlays the relevant records that have been modified by the workspace over records of the main branch while retaining main branch records with no correlating version in the workspace. This process generates a logical construction of the electronic database 150 provided through results of the query. Thus, the selected version is a derived form of the electronic database 150. The record module 130 uses the query to generate results from the electronic database 130 that form the selected version by parsing out or otherwise omitting non-relevant versions of records from the results and thus from being displayed at 940.

At 940, the record module 130 displays the selected version of the electronic database 150. In one embodiment, the record module 130 displays the selected version by returning results of the query to a requesting entity. Thus, the record module 130, in one embodiment, receives the results of the query from the electronic database 150 and provides the results to a remote device to cause the remote device to display the results. As discussed, the results are a subset of records from the electronic database 150 that embody the selected version. In this way, the record module 130 uses generic features of the electronic database 150 (e.g., queries with logical operators) to derive the selected version from the separate versions of records stored in the electronic database 150.

As one example of how a selected version of the electronic database 150 is derived by the record module 130 using a specially generated query, consider FIG. 10. FIG. 10 illustrates one embodiment of a selected version of the electronic database 150 for a workspace with a branch identifier of "DEV1" and a version identifier of "version 2." That is, the combination of a specific branch column value (i.e., branch identifier) and version column value (i.e., a version identifier for the branch) uniquely define the selected version. Of course, depending on how a particular branch is defined, the version identifier may not be used since a branch may include just a single internal version.

In either case, the tables 1005, 1010, and 1015 represent results of a query generated by the record module 130 and returned from the electronic database 150. Records of the tables 1005, 1010, and 1015 generally correlate with records from the tables 505, 510 and 515 of FIG. 5. Thus, reviewing FIGS. 5 and 10 together illustrates how the record module 130 uses the ranked query to retrieve records 525 and 535 instead of original versions 545 and 550. This is because versions 525 and 535 are specific to the workspace DEV1 and subversion within the workspace of version 2 and are thus part of the selected version of the electronic database 150 for the workspace.

Additionally, further records from the tables 505, 510, and 515 that do not have corresponding separate versions are carried over. In this way, the versions specific to the workspace are logically overlaid onto the MAIN branch to provide a selected version of the electronic database 150 with changes that are particular to the requesting workspace. Thus, a developer viewing the workspace DEV1 and the subversion of the workspace of version 2 sees the changes specific to that version and is not presented with the other versions from branch DEV2 or redundant original records of the MAIN branch. In this way, a select version of the electronic database 150 is materialized for a specific user while multiple versions of records that combine to form multiple versions of the electronic database 150 co-exist within a single instance of the electronic database 150.

Computing Device Embodiment

Figure 11:
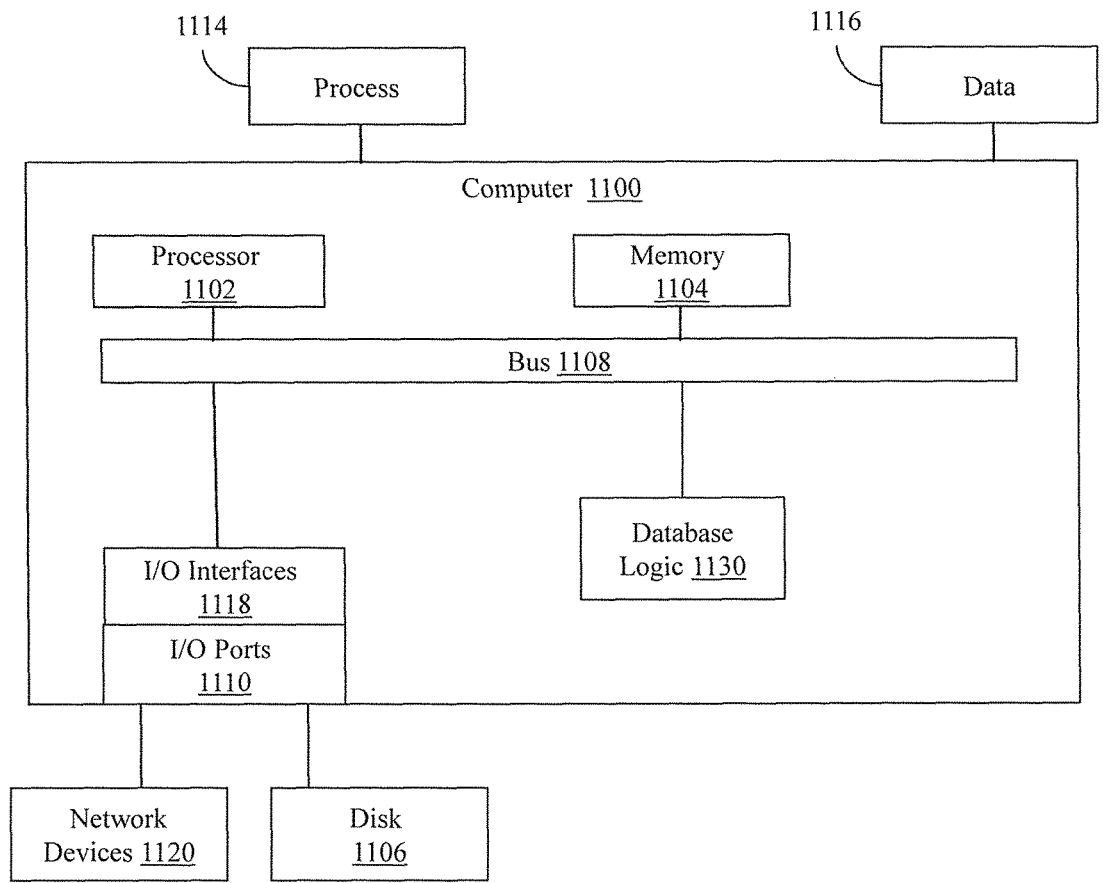
FIG. 11 illustrates an embodiment of a computing system configured with the example systems and/or methods disclosed.

FIG. 11 illustrates an example computing device that is configured and/or programmed with one or more of the example systems and methods described herein, and/or equivalents. The example computing device may be a computer 1100 that includes a processor 1102, a memory 1104, and input/output ports 1110 operably connected by a bus 1108. In one example, the computer 1100 may include database logic 1130 configured to facilitate storing separate versions of records within a single database similar to computing system 100 shown in FIG. 1. In different examples, the database logic 1130 may be implemented in hardware, a non-transitory computer-readable medium with stored instructions, firmware, and/or combinations thereof. While the logic 1130 is illustrated as a hardware component attached to the bus 1108, it is to be appreciated that in other embodiments, the logic 1130 could be implemented in the processor 1102, stored in memory 1104, or stored in disk 1106.

In one embodiment, database logic 1130 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smartphone, laptop, tablet computing device, and so on.

The means may be implemented, for example, as an ASIC programmed to intercept change requests and add separate copies of records with the changes in the database instead of overwriting an original record. The means may also be implemented as stored computer executable instructions that are presented to computer 1100 as data 1116 that are temporarily stored in memory 1104 and then executed by processor 1102.

Database logic 1130 may also provide means (e.g., hardware, non-transitory computer-readable medium that stores executable instructions, firmware) for adding additional columns in a database to track separate versions of records and for merging separate branches of the database.

Generally describing an example configuration of the computer 1100, the processor 1102 may be a variety of various processors including dual microprocessor and other multi-processor architectures. A memory 1104 may include volatile memory and/or non-volatile memory. Non-volatile memory may include, for example, ROM, PROM, and so on. Volatile memory may include, for example, RAM, SRAM, DRAM, and so on.

A storage disk 1106 may be operably connected to the computer 1100 via, for example, an input/output (I/O) interface (e.g., card, device) 1118 and an input/output port 1110. The disk 1106 may be, for example, a magnetic disk drive, a solid state disk drive, a floppy disk drive, a tape drive, a Zip drive, a flash memory card, a memory stick, and so on. Furthermore, the disk 1106 may be a CD-ROM drive, a CD-R drive, a CD-RW drive, a DVD-ROM, and so on. The memory 1104 can store a process 1114 and/or data 1116, for example. The disk 1106 and/or the memory 1104 can store an operating system that controls and allocates resources of the computer 1100.

The computer 1100 may interact with input/output (I/O) devices via the I/O interfaces 1118 and the input/output ports 1110. Input/output devices may be, for example, a keyboard, a microphone, a pointing, and selection device, cameras, video cards, displays, the disk 1106, the network devices 1120, and so on. The input/output ports 1110 may include, for example, serial ports, parallel ports, and USB ports.

The computer 1100 can operate in a network environment and thus may be connected to the network devices 1120 via the I/O interfaces 1118, and/or the I/O ports 1110. Through the network devices 1120, the computer 1100 may interact with a network. Through the network, the computer 1100 may be logically connected to remote computers. Networks with which the computer 1100 may interact include, but are not limited to, a LAN, a WAN, and other networks.

Definitions and Other Embodiments

In another embodiment, the described methods and/or their equivalents may be implemented with computer-executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smartphone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term, and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium," as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic," as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection," or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User," as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both." When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing instructions that when executed by one or more processors cause the one or more processors to perform at least:

enabling an electronic database to concurrently store separate versions of a record by using a set of system columns to maintain the separate versions together in the electronic database and provide access to each of the separate versions in isolation from one another, wherein the set of system columns uniquely identify the separate versions of the records and include at least a source column that points to an originating version for each of the separate versions of the records, wherein a schema of the electronic database includes the set of system columns and a row identifier column that stores values to uniquely identify database records including the record and the separate versions of the record;

in response to identifying a change request to modify the record, generating an additional version of the record in the electronic database by adding the additional version into the electronic database with a new row identifier in the row identifier column and a row identifier from the record stored in the source column to uniquely identify the additional version as a version of the record and avoid conflicts between multiple versions of the record that co-exist within the electronic database; and displaying, in a workspace, a selected version of the record by querying the electronic database using attributes of the workspace, wherein the attributes uniquely identify the workspace and records of the electronic database associated with the workspace so that the query produces a result that corresponds to the selected version while parsing non-relevant versions of the record from being displayed, and wherein the selected version of the record is included in the result as part of a selected version of the electronic database that is defined according to a branch of the workspace, wherein displaying the selected version of the record includes displaying the selected version of the database by using the query to retrieve a plurality of records associated with a branch identifier from the electronic database, and wherein the plurality of records include a subset of records in the electronic database that form the selected version of the electronic database.

2. The non-transitory computer-readable medium of claim 1, wherein generating the additional version of the record includes:
   adding the new row in the electronic database;
   copying the record specified by the request into the added new row;
   marking the added new row according to identifiers associated with the request to indicate that the added new row is specific to a particular version of the electronic database associated with a workspace, and wherein marking includes retrieving a branch identifier from the request that identifies the workspace and storing the branch identifier in the branch column of the added new row; and
   modifying the added new row according to the request in place of modifying the record specified by the request.

3. The non-transitory computer-readable medium of claim 1, wherein querying the electronic database includes ranking the separate versions of the record using a branch priority ranking that identifies which of the separate versions correspond to the selected version of the branch, wherein the branch priority ranking applies weights to separate branches in the electronic database according to which of the branches correlates with the selected version,
   wherein displaying the selected version includes retrieving the selected version as a result of the query from the electronic database, and
   wherein retrieving the selected version includes overlaying modifications of the selected version onto a main version of the electronic database to derive the selected version to include versions of records specific to the selected version and unchanged versions that are common to the electronic database.

4. The non-transitory computer-readable medium of claim 1, further comprising instructions configured to cause the one or more processors to perform at least:
   generating, in response to a workspace request, a branch identifier that uniquely identifies records of the electronic database modified through a workspace, wherein changes to records in the electronic database that correlate with the workspace are linked to the workspace using the branch identifier, and wherein the set of system columns includes a branch column that stores the branch identifier.

5. The non-transitory computer-readable medium of claim 4, wherein generating the additional version includes:
   determining attributes of a requesting workspace associated with the change request, wherein the attributes specify at least a branch identifier and a version of the electronic database associated with the requesting workspace, wherein the separate versions are independently linked with separate workspaces using branch identifiers stored in the branch column.

6. The non-transitory computer-readable medium of claim 1, further comprising instructions that when executed by the one or more processors cause the one or more processors to perform at least:
   merging two or more workspaces of the electronic database by integrating records of the electronic database with different branch identifiers into a single branch identifier.

7. The non-transitory computer-readable medium of claim 1, wherein enabling the separate versions includes:
   configuring the electronic database to concurrently maintain the separate versions by adding the set of system columns to the schema of the electronic database for tables in the electronic database that are to include records with separate versions, and
   initializing the records of the electronic database in response to the set of columns being added by populating the source identifier for each of the records using a row identifier of respective ones of the records, wherein the source identifier and the row identifier match when a respective one of the records is an original record.

8. A computing system, comprising:
   one or more processors;
   a non-transitory storage medium storing:
   a system module including instructions that when executed by the one or more processors cause the one or more processors to perform at least:
   enabling an electronic database to concurrently store separate versions of a record by using a set of system columns to maintain the separate versions together in the electronic database and provide access to each of the separate versions in isolation from one another, wherein the set of system columns uniquely identify the separate versions of the records and include at least a source column that points to an originating version for each of the separate versions of the records, and
   wherein a schema of the electronic database includes the set of system columns and a row identifier column that stores values to uniquely identify database records including the record and the separate versions of the record; and
   a record module including instructions that when executed by the one or more processors cause the one or more processors to perform at least:
   in response to identifying a change request to modify the record, generating an additional version of the record in the electronic database by adding the additional version into the electronic database with a new row identifier in the row identifier column and a row identifier from the record stored in the source column to uniquely identify the additional version as a version of the record and avoid conflicts between multiple versions of the record that co-exist within the electronic database; and
   displaying, in a workspace, a selected version of the record by querying the electronic database using attributes of the workspace, wherein the attributes uniquely identify the workspace and records of the electronic database associated with the workspace so that the query produces a result that corresponds to the selected version while parsing non-relevant versions of the record from being displayed and querying the electronic database by ranking the separate versions of the record using a branch priority ranking that identifies which of the separate versions correspond to the selected version of a branch of the workspace, and
   wherein displaying the selected version includes retrieving the selected version as a result of the query from the electronic database; and
   wherein the selected version of the record is included in the result as part of a selected version of the electronic database that is defined according to the branch of the workspace.

9. The computing system of claim 8, wherein the instructions for enabling the separate versions of the system module include instructions for:
   configuring the electronic database to concurrently maintain the separate versions by adding the set of system columns to the schema of the electronic database for tables in the electronic database that are to include records with separate versions, and initializing the records of the electronic database in response to the set of columns being added by populating the source identifier for each of the records using a row identifier of respective ones of the records, wherein the source identifier and the row identifier match when a respective one of the records is an original record.

10. The computing system of claim 8, wherein the instructions for generating the additional version of the record of the record module further include instructions for:

adding the new row in the electronic database;

copying the record specified by the request into the added new row;

marking the added new row according to identifiers associated with the request to indicate that the added new row is specific to a particular version of the electronic database associated with a workspace, and wherein marking includes retrieving a branch identifier from the request that identifies the workspace and storing the branch identifier in the branch column of the added new row; and modifying the added new row according to the request in place of modifying the record specified by the request.

11. The computing system of claim 8, wherein the system module further includes instructions for:

generating, in response to a workspace request, a branch identifier that uniquely identifies records of the electronic database modified through a workspace, wherein changes to records in the electronic database that correlate with the workspace are linked to the workspace using the branch identifier, and wherein the set of system columns includes a branch column that stores the branch identifier.

12. A computer-implemented method, the method comprising:

enabling an electronic database to concurrently store separate versions of a record by using a set of system columns to maintain the separate versions together in the electronic database and provide access to each of the separate versions in isolation from one another, wherein the set of system columns uniquely identify the separate versions of the records and include at least a source column that points to an originating version for each of the separate versions of the records, and wherein a schema of the electronic database includes the set of system columns and a row identifier column that stores values to uniquely identify database records including the record and the separate versions of the record;

in response to identifying a change request to modify the record, generating an additional version of the record in the electronic database by adding the additional version into the electronic database with a new row identifier in the row identifier column and a row identifier from the record stored in the source column to uniquely identify the additional version as a version of the record and avoid conflicts between multiple versions of the record that co-exist within the electronic database; and displaying, in a workspace, a selected version of the record by querying the electronic database using attributes of the workspace, wherein the attributes uniquely identify the workspace and records of the electronic database associated with the workspace so that the query produces a result that corresponds to the selected version while parsing non-relevant versions of the record from being displayed, and wherein the selected version of the record is included in the result as part of a selected version of the electronic database that is defined according to a branch of the workspace, wherein displaying the selected version of the record includes displaying the selected version of the database by using the query to retrieve a plurality of records associated with a branch identifier from the electronic database, and wherein the plurality of records include a subset of records in the electronic database that form the selected version of the electronic database.

13. The computer-implemented method of claim 12, copying the record specified by the request into an added new row of the electronic database;

marking the added new row according to identifiers associated with the request to indicate that the added new row is specific to a particular version of the electronic database associated with a workspace, and wherein marking includes retrieving a branch identifier from the request that identifies the workspace and storing the branch identifier in the branch column of the added new row; and modifying the added new row according to the request in place of modifying the record specified by the request.

14. The computer-implemented method of claim 12, wherein enabling the separate versions includes:

configuring the electronic database to concurrently maintain the separate versions by adding the set of system columns to the schema of the electronic database for tables in the electronic database that are to include records with separate versions, and initializing the records of the electronic database in response to the set of columns being added by populating the source identifier for each of the records using a row identifier of respective ones of the records, wherein the source identifier and the row identifier match when a respective one of the records is an original record.

* * * * *

UNITED STATES PATENT AND TRADEMARK OFFICE
CERTIFICATE OF CORRECTION

PATENT NO. : 10,387,401 B2
APPLICATION NO. : 15/268809
DATED : August 20, 2019
INVENTOR(S) : Jain et al.

Page 1 of 1

It is certified that error appears in the above-identified patent and that said Letters Patent is hereby corrected as shown below:

In the Specification

In Column 2, Line 50, delete ". simply" and insert -- simply --, therefor.

In the Claims

In Column 18, Line 34, in Claim 1, after "records," insert -- and --.

Signed and Sealed this
Twenty-fifth Day of August, 2020

Andrei Iancu
*Director of the United States Patent and Trademark Office*